United States Patent [19]

Horikawa et al.

[11] Patent Number: 5,085,871
[45] Date of Patent: Feb. 4, 1992

[54] FEED COMPOSITON FOR FOWLS

[75] Inventors: Hiroshi Horikawa; Akira Fukazawa; Tetsuya Hori; Kunihiko Ishii, all of Tochigi, Japan

[73] Assignees: C. Itoh Feed Mills; Meiji Seika Kaisha, Ltd., both of Japan

[21] Appl. No.: 523,182

[22] Filed: May 14, 1998

Related U.S. Application Data

[63] Continuation of Ser. No. 348,286, May 5, 1989, abandoned.

[30] Foreign Application Priority Data

May 12, 1988 [JP] Japan .................................. 63-113453

[51] Int. Cl.$^5$ .............................................. A23K 1/00
[52] U.S. Cl. ........................................... 426/2; 426/42; 426/74; 426/623; 426/630; 426/656; 426/657; 426/807
[58] Field of Search ................ 426/42, 623, 630, 656, 426/657, 807, 74, 2

[56] References Cited

U.S. PATENT DOCUMENTS

| | | | |
|---|---|---|---|
| 4,358,465 | 11/1982 | Brule et al. | 426/42 |
| 4,361,587 | 11/1982 | Brule et al. | 426/42 |
| 4,495,176 | 1/1985 | Brule et al. | 426/42 |
| 4,816,398 | 3/1989 | Brule et al. | 426/42 |

FOREIGN PATENT DOCUMENTS 0090406  5/1983  European Pat. Off. .

OTHER PUBLICATIONS

Journal of Nutrition—"Enhanced Absoprtion . . ." by Mykkanen, et al., 1980, pp. 2141-2148.
Resume No. 861480811—Abstract—"Protein Hydrolysate . . ." Reported in Commonwealth Agricultural Bureau.
"Intestinal Protein Digestion and Mineral Bioavailability with Special Reference to Casein Phosphopeptide on Ca Absorption." Hiroshi Naito. Bifidobacteria Microflora, vol. 6(1), 1986.

Primary Examiner—R. B. Penland
Attorney, Agent, or Firm—McAulay, Fisher, Nissen, Goldberg & Kiel

[57] ABSTRACT

A feed composition for fowls containing casein phosphopeptide.

The feed compositon increases calcium intake of fowls, and when it is fed to chicks it brings increase in bone growth and body weight, low feed requirement and high breeding efficiency. When it is fed to adult chickens for egg production in a later stage, egg breakage is decreased by little decrease of eggshell strength.

5 Claims, No Drawings

FEED COMPOSITON FOR FOWLS

This application is a continuation of application Ser. No. 348,286, filed May 5, 1989 now abandoned.

BACKGROUND OF THE INVENTION

1. Field of the Invention

This invention relates to a feed composition for fowls which improves calcium intake, bone formation and eggshell quality.

2. Description of the Prior Art

Feed compositions for fowls contain a protein source, an energy source, a calcium source, a phosphorus source, vitamins, minerals and the like. The protein is fish meal, soybean cake, rapeseed cake, feather meal, meat bone meal or the like, and as the calcium source, calcium carbonate is blended in a form of shell powder.

Recently, breeding space per one fowl gradually decreased according to the scale expansion and intensiveness in fowl breeding, and as a result, the motion quantity of the fowls gradually decreased. Besides, the fowls were not bred under natural light, and therefore, the breeding circumstances became worse for the bone growth of the fowls. Moreover, in the case of adult chicken for the production of eggs, there is a problem in eggshell quality. In general, eggshell quality of adult chicken for the production of eggs becomes worse after 400 days old. Eggshell also becomes worse in summer season by a high temperature stress. In order to improve the formation of bone and eggshell, commercial feeds usually contain a sufficient amount of the nutrients necessary for forming bone and eggshell such as a calcium source, a phosphorus source, various vitamins and minerals. However, when the blending amounts of these nutrients are increased, there is a limit to the improvement in bone and eggshell formation. Therefore, it is desired to develop another means of increasing calcium intake and improving the formation of bone and eggshell.

SUMMARY OF THE INVENTION

An object of the invention is to provide a feed composition capable of increasing calcium intake of a fowl.

Another object of the invention is to provide a feed composition for chick excellent in bone growth, increase of body weight, low feed requirement and high breeding efficiency.

Another object of the invention is to provide a feed composition for adult chicken for the production of eggs capable of decreasing broken egg, increasing eggshell strength and elongating the exchanging cycle of the adult chicken.

The present inventors investigated in order to achieve such objects, and found that, when casein phosphopeptide is added to a feed composition for fowl, calcium intake increases and the formations of bone and eggshell are promoted. Thus, the present invention provides a feed composition for fowls to which casein phosphopeptide is blended.

DETAILED DESCRIPTION OF THE INVENTION

The casein phosphopeptide is a hydrolyzate of casein, and it is a phosphopeptide having an active site to bind to calcium. There are three kinds of casein, i.e., α-casein, β-casein and γ-casein, and every one may be used for the feed composition of the invention. With respect to casein phosphopeptide, there are some reports, and it has been elucidated that the hydrolyzate of α-casein decomposed with trypsin is the peptide chain portion of $Asp^{43}$-$Lys^{79}$, and the hydrolyzate of β-casein decomposed with trypsin is the peptide chain portion of N-terminal-$Arg^{25}$. However, the casein phosphopeptide may be any other one having an active site to bind to calcium and a molecular weight being absorbable from the intestinal tract of a fowl. The active site to bind to calcium is now considered the portion of

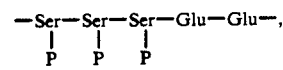

and the molecular weight may be less than about 10,000. The decomposition method for producing casein phosphopeptide is not restricted, however, preferable methods use a protease not decomposing the active site, such as pepsin or trypsin. The content of the casein phosphopeptide is about 0.01 to 3 wt. %, and about 0.01 to 1 wt. % is preferred.

The other components of the feed composition may be the same as a known feed for fowls, and include a protein source, an energy source, a calcium source, a phosphorus source, vitamins, minerals and the like. The protein source is fish meal, soybean cake, rapeseed cake, feather meal, meat bone meal or the like, and amino acids such as DL-methionine, L-tryptophan, L-lysine or L-threonine may be added for the complement of amino acid imbalance. As the energy source, there are carbohydrates, such as corn, milo and wheat flour, and fats, such as fat for feed, soybean oil and powder fat. As the calcium source, there is calcium carbonate. The feed composition contains about 12 to 25% of crude protein, about 3 to 10% of crude fats, about 1 to 4.5% of calcium and about 2,700 to 3,300 kcal/kg of ME.

The feed composition of the invention may be manufactured according to a conventional process, and the casein phosphopeptide may be blended together with other feed components, or blended separately.

The feeding method of the feed composition to fowl may also be conventional. The fowls suitable for the feed composition of the invention are chicks of 0 day old to 10 weeks old.

EXAMPLES

Example 1

Casein was dissolved in water in a concentration of 20 w/w %, and 0.05% of crystal trypsin as a ratio to the solid weight of the casein was added. The mixture was allowed to react at 50° C. at pH 7.0 for 2 hours, and then the enzyme was inactivated. The reaction mixture was concentrated, and dried by spray drying to obtain casein phosphopeptide.

A commercial prestarter feed of egg-type chicks ("CI Pre-starter", trade name, C. Itoh Feed Mills Co., Ltd.) was blended with 0.3 wt. %, 1.0 wt. % or 3.0 wt. % of the casein phosphopeptide ("CPP", trade name Meiji Seika Kaisha, Ltd.) to prepare three kinds of the feed containing CPP. For comparison, the same amount of casein was blended to the same commercial feed instead of CPP to prepare also three kinds of the feeds.

210 chicks of 0 day old were divided into 21 groups each composed of 10 chicks, and 7 test sections each composed of three groups were prepared. Each test section was fed with one of the above 6 kind feeds or the original commercial feed not blended with CPP nor casein, and bred for 10 days.

The breeding results are summarized in Table 1.

TABLE 1

| Section | CPP Content (%) | Casein Content (%) | Breeding Result | | | |
|---|---|---|---|---|---|---|
| | | | Increase of Body Weight (g) | Feed Requirement | Thigh Bone Weight (g) | Ca Content of Thigh Bone (%) |
| 1 | — | — | 64.1 | 1.623 | 0.576 | 5.18 |
| 2 | 0.3 | — | 69.5 | 1.538 | 0.636 | 5.62 |
| 3 | 1.0 | — | 69.6 | 1.530 | 0.597 | 5.61 |
| 4 | 3.0 | — | 66.8 | 1.612 | 0.583 | 5.66 |
| 5 | — | 0.3 | 60.2 | 1.747 | 0.537 | 5.26 |
| 6 | — | 1.0 | 62.9 | 1.612 | 0.604 | 5.46 |
| 7 | — | 3.0 | 63.8 | 1.619 | 0.560 | 5.28 |

Example 2

A commercial starter feed of egg-type chicks ("CI Starter A", trade name, C. Itoh Feed Mills Co., Ltd.) was blended with CPP so as to become 0.3 wt. %.

150 chicks of 7 days old were divided into 2 groups each composed of 75 chicks. One group was fed with the above feed blended with CPP, and the other group was fed with the original commercial feed not blended with CPP. Both groups were bred for two weeks up to 21 days old.

The breeding results are summarized in Table 2.

TABLE 2

| Group | Test Conditions | Increase of Body Weight (g) | Feed Requirement | Length of Crural Bone (mm) |
|---|---|---|---|---|
| 1 | Control CPP (−) | 142.8 | 3.38 | 53.3 |
| 2 | 0.3% CPP Added | 148.3 | 3.30 | 54.7 |

Example 3

A commercial layer feed ("CI Hispec", trade name, C. Itoh Feed Mills Co., Ltd.) was blended with CPP so as to become 0.03 wt. %, 0.10 wt. %, 0.30 wt. % or 1.00 wt. %.

100 adult chicknes of 481 days old were divided into 5 groups each composed of 20 chickens. Each group was fed with one of the above feeds or the original commercial feed not blended wtih CPP, and bred for 15 days. The eggshell strength of the eggs produced in the last 3 days of the test period was measured, and compared with that produced in the preliminary stage immediately before the test period.

The results are shown in Table 3.

TABLE 3

| CPP Group | Content (%) | Eggshell Strength | |
|---|---|---|---|
| | | Preliminary stage (CPP$_{(-)}$) | Test Period |
| 1 | — | 3.36 (100) | 2.94 (87.5) |
| 2 | 0.03 | 3.25 (100) | 3.22 (99.1) |
| 3 | 0.10 | 3.33 (100) | 3.33 (100.0) |
| 4 | 0.30 | 3.12 (100) | 2.91 (93.3) |
| 5 | 1.00 | 3.25 (100) | 3.07 (94.5) |

The number in parenthesis is the ratio to the eggshell strength at the preliminary stage (100).

We claim:

1. A method for feeding of fowl comprising feeding chicks of up to ten weeks of age with a calcium increasing effective amount of a feed composition consisting essentially of:
   (a) 12% to 25% by weight crude protein,
   (b) 3% to 10% by weight crude fat,
   (c) 1% to 4.5% by weight calcium, and
   (d) 0.01% to 1% by weight of a composition obtained by digesting casein with a proteolytic enzyme and concentrating and drying the entire casein phosphopeptide containing digestive product.

2. The method of claim 1 wherein the composition obtained in step d) consists essentially of casein phosphopeptide having a peptide chain of

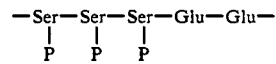

and a molecular weight of less than 10,000.

3. The method of claim 1 wherein the composition obtained in step d) consists essentially of casein phosphopeptide having the peptide chain portion of Asp$^{43}$ to Lys$^{79}$ of α-casein or the peptide chain portion of N-terminal to Arg$^{25}$ of β-casein.

4. The method of claim 1 wherein the proteolytic enzyme is pepsin or trypsin.

5. A method for feeding fowls which comprises feeding chicks of up to ten weeks old with a calcium increasing effective amount of a feed composition consisting essentially of:
   (a) 12% to 25% by weight crude protein,
   (b) 3% to 10% by weight crude fat,
   (c) 1% to 4.5% by weight calcium, and
   (d) 0.01% to 3.00% by weight of casein phosphopeptide having three active sites to bind calcium, which casein phosphopeptide consists essentially of the entire digestion product of casein obtained by digesting casein with a proteolytic enzyme and concentrating and drying the digestion product.

* * * * *

UNITED STATES PATENT AND TRADEMARK OFFICE
CERTIFICATE OF CORRECTION

Patent No.: 5,085,871

Issued: February 4, 1992

Inventor(s): Hiroshi HORIKAWA, et al.

It is certified that this error appears in the above-identified patent and that said Letters Patent is hereby corrected as shown below:

TITLE PAGE
The filing date should read as follows:

[22]   May 14, 1990

Signed and Sealed this

Fourteenth Day of December, 1999

Q. TODD DICKINSON

Attest:

Attesting Officer

Acting Commissioner of Patents and Trademarks